(12) United States Patent
Hoffman et al.

(10) Patent No.: US 6,648,942 B2
(45) Date of Patent: Nov. 18, 2003

(54) METHOD OF DIRECT IRON-MAKING / STEEL-MAKING VIA GAS OR COAL-BASED DIRECT REDUCTION AND APPARATUS

(75) Inventors: Glenn E. Hoffman, Lancaster, SC (US); Robert M. Klawonn, Charlotte, NC (US)

(73) Assignee: Midrex International B.V. Rotterdam, Zurich Branch, Zurich (CH)

( * ) Notice: Subject to any disclaimer, the term of this patent is extended or adjusted under 35 U.S.C. 154(b) by 0 days.

(21) Appl. No.: 10/056,319

(22) Filed: Jan. 25, 2002

(65) Prior Publication Data

US 2003/0097908 A1 May 29, 2003

Related U.S. Application Data

(60) Provisional application No. 60/264,496, filed on Jan. 26, 2001.

(51) Int. Cl.[7] .............................................. C21B 13/14
(52) U.S. Cl. ...................... 75/484; 75/10.15; 75/485; 75/500; 266/160; 266/175
(58) Field of Search .................... 75/484, 485, 500, 75/10.15; 266/160, 175

(56) References Cited

U.S. PATENT DOCUMENTS

| | | |
|---|---|---|
| 4,731,112 A | 3/1988 | Hoffman |
| 6,126,718 A | 10/2000 | Sawa et al. |
| 6,273,934 B1 * | 8/2001 | Dry ............................ 75/500 |

* cited by examiner

*Primary Examiner*—Melvyn Andrews
(74) *Attorney, Agent, or Firm*—Dougherty, Clements & Hofer

(57) ABSTRACT

The invention is a method and apparatus for iron-making/steel-making using a modified rotary hearth furnace, that is a finisher-hearth-melter (FHM) furnace. In the method the refractory surface of the hearth is coated with carbonaceous hearth conditioners and refractory compounds, where onto said hearth is charged with pre-reduced metallized iron. The pre-reduced metallized iron is leveled, then heated until molten, and then reacted with the carbon and reducing gas burner gases until any residual iron oxide is converted to iron having a low sulfur content. Nascent slag separates from the molted iron forming carburized iron nuggets. The nuggets are cooled, and then the iron nuggets and the hearth conditioners, including the refractory compounds, are discharged onto a screen, which separate the iron nuggets from the hearth conditioner. The hearth conditioner is recycled, and the iron nuggets are either prepared for sale or for additional treatment, such as alloying, in a final melter, where the final melter is preferably an electric furnace. Exhaust gases from the FHM furnace are recovered for calcining coal into fuel gases and coke.

33 Claims, 5 Drawing Sheets

METHOD OF DIRECT IRON-MAKING / STEEL-MAKING VIA GAS OR COAL-BASED DIRECT REDUCTION AND APPARATUS

CROSS-REFERENCE TO RELATED APPLICATION

This application claims the benefit of U.S. Provisional Application No. 60/264,496, filed on Jan. 26, 2001.

FIELD OF THE INVENTION

The invention relates generally to a method for iron-making, and more particularly to a FHM furnace method for iron making, using pre-reduced iron, where said FHM furnace method has improved economics, quality and environmental aspects.

BACKGROUND OF THE INVENTION

The present invention relates to means for utilizing a hot pre-reduced iron ore charge to the hearth furnace for the purposes of increasing productivity, improving overall process thermal efficiency, reducing sulfur and lowering emission loading. The invention in turn relates to charging hot, highly metallized DRI product to an ITmk3 "Finisher" furnace to effect melting of the DRI to produce nuggets of pure iron (steel), which contain no gangue components. Resulting steel nuggets can then be charged to an electric furnace for further processing (i.e., melting, alloying) into molten steel, which is suitable for casting into billets, and other desirable steel products. Hot, highly metallized product can preferably be sourced from a Midrex DRI shaft furnace or a rotary hearth furnace.

ITmk3 furnace technology was developed by Kobe Steel, LTD of Osaka, Japan, to separate metal from iron ore using coal. Briefly, ITmk3 technology employs a pellet of finely ground iron ore compounded with coal dust and a binder, to metallize the iron oxide into iron, melt and express slag, and then a means to separate a hot iron nugget from the slag.

Liquid (molten) steel is primarily produced by two methods; blast furnace/basic oxygen furnace (BF/BOF), or the electric arc furnace (EAF). The BF/BOF route depends on the production of hot metal from the blast furnace (typical liquid pig iron analysis of>4% carbon, 0.5~1.0% silicon, 0.05% sulfur and 0.04% phosphorus) as a source of both virgin iron units and 'fuel' to the BOF converter. The charge to a BOF converter typically contains 20~30% scrap steel and the remainder liquid hot metal. On the other hand, the EAF can theoretically process a charge of essentially 100% scrap steel. However, the preferred economical charge for an EAF may contain 5 to 15% solid pig iron and/or other alternative iron sources, e.g., 10~85% or more DRI (direct reduced iron) and/or HBI (hot briquetted iron). The solid pig iron, similar to the liquid pig iron, acts as both a source of virgin iron units and carbon/silicon fuel which, when processed correctly, reduces the electrical energy requirement for melting the scrap steel charge. Therefore, the use of oxygen is common to both BF/BOF and EAF steel-making routes for the purpose of promoting chemical energy from oxidation reactions (heat generated by oxidation of carbon, silicon and iron). Also, slag conditioners (primarily burnt lime or dolomitic lime) are added to the charges of the BOF or EAF for the purpose of desulfurization of the liquid steel. The resultant slag volume can typically be 100~200 kg/mt of liquid steel, with 30~40% by weight of the slag being iron oxide.

The problem presented is to devise an economical, low capital cost iron-making or steel-making process that exhibits both a high iron yield and high degree of energy efficiency for the production of either an iron shot intermediate product, or a liquid (molten) steel product that is suitable for further processing into semi-finished steel products (slabs, blooms, billets, sheet). The present invention is a process that achieves production of iron shot, or direct steel-making by means of coupling an established technology for iron ore pre-reduction, such as the Midrex natural gas-based direct reduction technology, with a modified moving hearth furnace, where the modified moving hearth furnace is a novel coal-based moving "finisher" hearth melter (FHM) furnace with a refractory surface, whereby there is no necessity for decarburization of the iron product exiting the FHM furnace.

RELATED PRIOR ART

Applicant is aware of the following related U.S. Pat. Nos.:

| U.S. Pat. No. | Issue Date | Inventor | Title |
| --- | --- | --- | --- |
| 4,731,112 | Mar. 15, 1988 | Hoffman | Method of Producing Ferrro-Alloys |
| 6,126,718 | Oct. 3, 2000 | Sawa et al. | Method of Producing A Reduced Metal, and Traveling Hearth Furnace For For Producing Same |

Hoffman, U.S. Pat. No. 4,731,112, discloses a method of making a molten ferroalloy product in a melting furnace by charging a briquette consisting essentially of metallized iron, granulated alloying metal oxide, into a carbon source, such as coke breeze, to the melting furnace, burning solid carbonaceous material to reduce the alloying metal oxide to metallized form and to heat the charge to form a molten ferroalloy product. Fluxes and slag formers are also charged to the furnace as required.

Sawa et al, U.S. Pat. No. 6,126,718, discloses a method of producing iron from a metal-containing reducible material comprised of iron oxide compounded with metal reducing materials in a rotary hearth furnace. In the Sawa '718 method, the reducible material is filled into horizontal trays, where said horizontal trays resemble ice trays. The filled horizontal trays are conveyed through a hearth furnace that is fired with a hot reducing, mixture of gases. The reducible material, which contains iron oxide, is converted into iron. In the latter zones of the rotating hearth furnace, the reducible mixture melts, forming liquid iron having a cap of slag. The iron and slag are cooled, and then separated by screening into iron and slag.

SUMMARY OF THE INVENTION

The present invention performs iron ore pre-reduction by means of established gas or coal-based direct reduction technologies which can use low sulfur syngas, natural gas or coal, and which have:

A high degree of process control,

High process fuel and thermal efficiency,

Low gangue in the reduced iron product (typically less than 5%) translates directly into reduced slag generation in the FHM furnace, Production of highly reduced iron of uniform chemistry, carbon content of 0–6.7%, and low sulfur content by virtue of using natural gas, syngas, etc., as the reductant source, where natural gas and the like have very low sulfur content, especially as compared to certain grades of coal.

High quality reduced iron product is charged (preferably hot) to a moving "finisher" hearth melter (FHM) furnace whereby controlled melting can be effected to produce iron shot nuggets (having a content of 0.01–4% C) that are free of all gangue material. Any carbon contained in the hot reduced iron product is able to reduce a portion of, or nearly all of, the residual iron oxide.

Prior to charging the hot reduced iron to the FHM furnace refractory surface, the hearth surface is covered with hearth conditioning materials, comprised of a hearth conditioner which is a hearth carbonaceous material such as graphite, anthracite coal, petroleum coke, etc., and may also contain refractory compounds such as $SiO_2$, CaO, alumina, bauxite, $CaF_2$ (fluorspar), magnesia, magnesite, etc. A portion of the hearth carbonaceous material acts as the source of solid carbon that diffuses into the metallic iron to lower the effective melting point and to promote formation of nuggets. The remainder of the hearth conditioning material acts as a protective layer which supports the molten iron nugget and the nascent separated slag, and prevents penetration of liquid iron/slag into the hearth refractory. In addition, some of the carbonaceous material is oxidized by the burner combustion products to form carbon monoxide. Carbon monoxide is a reductant, and it acts to reduce iron oxide to elemental iron. Provision is also made in the invented process to coat or dust the outer surface of the pre-reduced metallized iron with a powdered carbonaceous material, where the powdered carbonaceous material is usually very similar to the hearth conditioner. The pre-reduced metallized iron is coated just prior to being charged onto the hearth surface. The pre-reduced metallized iron is charged hot (500~900° C.), and the energy required for subsequent heating/melting is significantly lower than that required for conventional RHF (rotary hearth furnace) operation which includes the energy required for initial heating and pre-reduction. It is estimated that the burner fuel requirement is <0.7 Gcal/mt-nuggets. Also, the FHM furnace residence time is significantly reduced, ~50%, from 12 to approximately 6 minutes or less. Cold, reduced iron can also be charged to the FHM furnace, but the energy requirement is greater, and the residence time is longer. The nominal discharge temperature of the steel nuggets from the FHM furnace is in the range of 1,100~1,300° C. If the carbon content of the nugget is very low (<0.3%), then the discharge temperature is higher, in the range of 1300 to >1430° C. If higher carbon content is desired, then lower discharge temperatures are required. The FHM furnace is capable of facilely producing steel nuggets that have a higher carbon content than the usual RHF DRI product. Therefore, when the FHM furnace nugget carbon content exceeds 0.3%; the resultant nugget discharge temperature from the FHM furnace must be reduced.

The atmosphere in the FHM furnace (reducing in nature such that a minimum of 10% combustibles is present) can be generated by air/fuel burners, where fuel is preferably (but not limited to) fuel gas or natural gas (or an equivalent mixture of fuel gases having a heating value similar to natural gas), and process air, where both the fuel gas and the process air are preheated to 450~700° C. by means of conventional heat recuperation means applied to the FHM furnace off-gas. Other suitable fuels could be waste oil, coal, etc. Some possibilities for generating a portion or possibly all of the fuel gas requirements for the FHM furnace burners can be achieved by either heating (de-volatizing) or calcining the coal required for the hearth conditioning step by diverting a portion of the conditioned spent flue gas exiting the FHM furnace to an indirect heater, or a fluid bed type calciner.

After being discharged from the FHM furnace, the hot nuggets (at a temperature of 900~1,450° C.) are hot screened, preferably by a water cooled moving screen system whereby the product nuggets are physically separated from the hearth conditioning material and small amounts of slag. The iron/steel nuggets can be quenched, or they may be fed directly to a final melter (preferably an electric furnace, but more preferably a channel induction melting furnace having a substantial liquid steel heel), while the underside carbonaceous hearth protection material and any mini-nuggets can be cooled, magnetically separated and then recycled back to the FHM furnace. The channel induction furnace is the preferred melter for this application due to the fact that the energy requirement for melting the product steel nuggets is low (120~200 kWh/mt), the melter charge is virtually 100% metallic steel nuggets with no gangue that can attack the refractory lining in the heating coils, the melter atmosphere can be easily controlled against reoxidation, and the expected melter maintenance is low. The nuggets are then re-melted in the final melter where the liquid metal bath chemistry can be adjusted by small alloying additions. The final melter can then be tapped (intermittently or continuously), and the molten metal stream directed to a tundish that meters liquid steel to a continuous caster. The invented process and apparatus eliminates the need for ladles and large overhead cranes.

BRIEF DESCRIPTION OF THE DRAWINGS

The invention will become more readily apparent by referring to the following detailed description and the appended drawings in which:

FIG. 4*a* shows the hearth with the hearth conditioning materials.

FIG. 4*b* illustrates a means for distributing the pre-reduced metallized iron evenly onto the hearth.

DETAILED DESCRIPTION OF THE ILLUSTRATED EMBODIMENT

The invention is a method of direct iron-making/steel-making via gas or coal based direction. Pre-reduced metallized iron from a DRI shaft furnace or from a rotary hearth furnace is inputted into a FHM furnace. In the FHM furnace, the pre-reduced metallized iron is melted forming liquid iron nuggets and further reduced. Slag is formed and separates from the iron, and then in a later stage, the iron and slag are solidified and separated into two material streams, for either further refining or recycling. The method further describes how energy from the FHM furnace is recovered and used to convert coal into fuel gases, hearth conditioning materials and other carbonaceous materials, electricity, and to augment other energy intensive processes.

Figure 1:
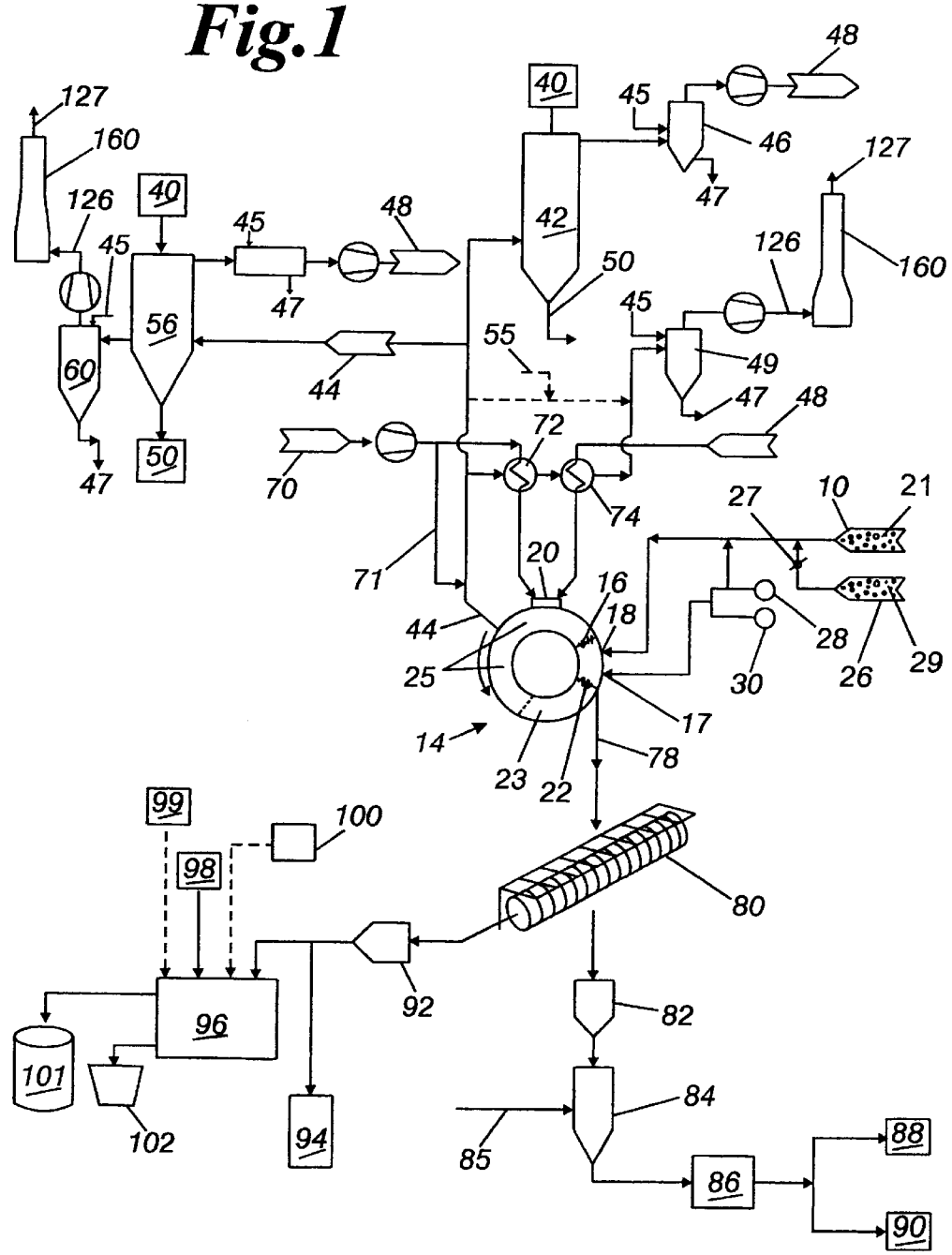
FIG. 1 is a schematic diagram of an iron-making or steel-making process in accordance with the invention, utilizing hot, pre-reduced iron ore charge from the output of the process of FIG. 2, or cold, highly metallized DRI, or a blend of the two.
Figure 4A:
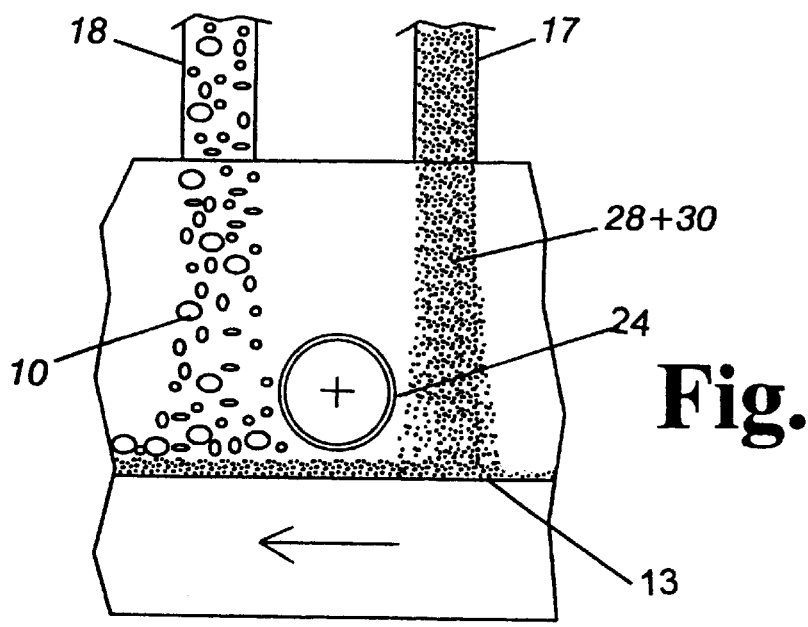
FIG. 4*a* is a sectional view of the FHM furnace, where sectional view
Figure 4B:
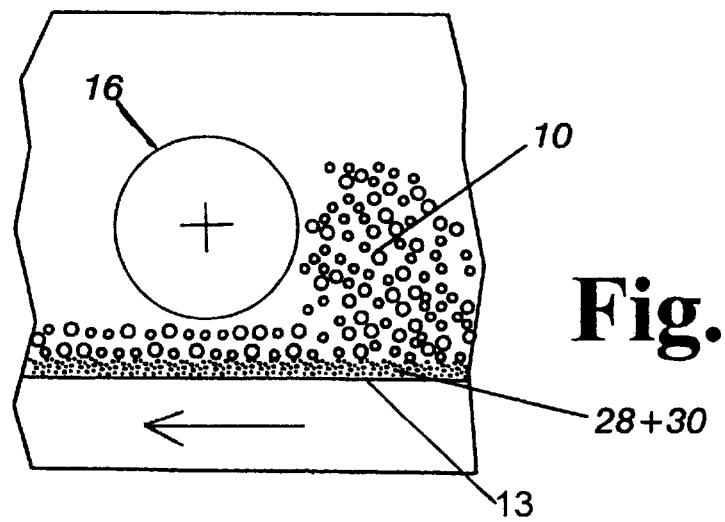
FIG. 4*b* is a sectional view of the FHM furnace, where sectional view
Figure 5:
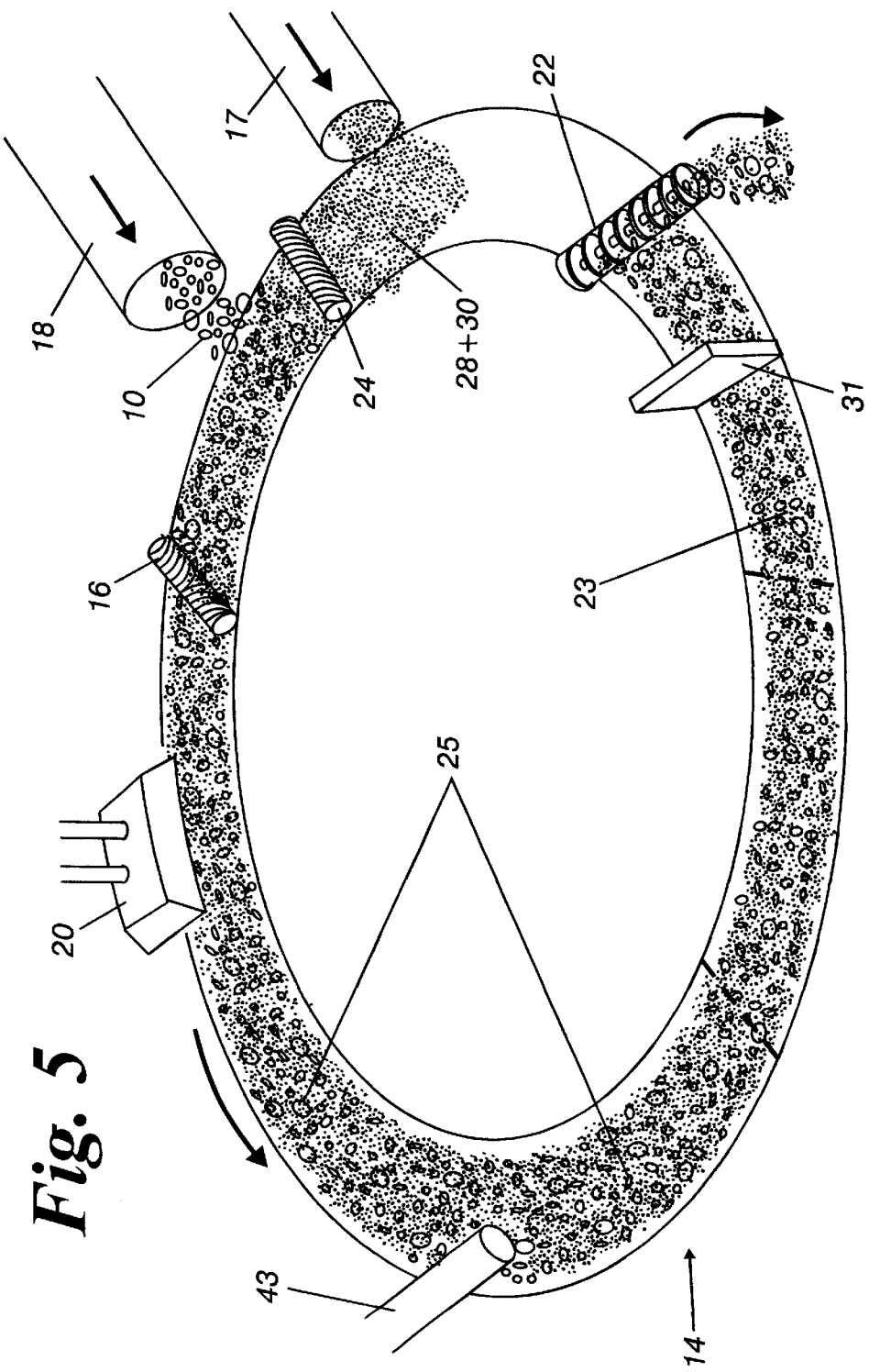
FIG. 5 is a diagrammatic planar view of the FHM furnace in accordance with the invention.

Referring now to FIG. 1, charge material 10, is preferably pre-reduced metallized iron that is about 70 to 90% metallized iron at a temperature of approximately about 700 to 1100° C. The pre-reduced metallized iron 10 is conveyed directly, hermetically and continuously from holding bin 21 to the FHM furnace 14, which is shown as a rotary hearth furnace. The FHM furnace 14 shown in FIG. 1 rotates counterclockwise when viewed from the perspective of the reader. An enlarged overhead view of FHM furnace is shown in FIG. 5, and sectional views of the FHM furnace are shown in FIG. 4a and 4b. The FHM furnace 14 is provided with a pellet leveler 16 near the charge feed entrance 18. The pellet leveler 16 is preferably a screw device with flights, spikes nubs, etc. to assist in gently moving the feed materials 10 to preferably a single layer. The FHM furnace is provided with appropriate burners 20 or other heating devices, and a product discharge device 22, which preferably is an auger. Cold, highly metallized DRI or other metallized iron-bearing product 29 from storage bin 26 may also be fed into the conveyance system for the furnace at 27 along with hot, pre-reduced metallized iron charge, or other metallized iron-bearing product charge material from holding bin 21. Hearth conditioning materials, comprised of a hearth conditioner 28 which is a hearth carbonaceous material such as graphite, anthracite coal, petroleum coke, coke breeze, etc., and may also contain refractory compounds 30 such as $SiO_2$, CaO, alumina, bauxite, $CaF_2$ (fluorspar), magnesia, magnesite, etc. may be fed into the furnace with the charge materials 10. Refractory compounds 30 and hearth conditioners 28 also can be dispersed on the hearth surface 13 of FIG. 4a and 4b (which can also have refractory or residual hearth conditioning material) of the FHM furnace 14, through material feeder 17, ahead of the pre-reduced metallized iron charge feeder 18. An optional hearth conditioner/refractory compounds smoothing device 24, as shown in FIG. 5, can be used to prepare a smooth surface prior to charging metallized materials 10 and 29. The smoothing device 24 is preferably an auger-screw device. The pre-reduced metallized iron is preferably dusted with powdered carbonaceous materials. Calcium oxide (lime) can be added to further lower the level of sulfur in the iron and the nascent slag, which is already low as consequence of selecting a natural gas DRI for a charge material.

The pre-reduced metallized iron charge material 10, along with hearth conditioning materials, is distributed by the pellet leveler 16. The FHM furnace hearth conveys the pre-reduced metallized iron charge material into the burner zone 25. The burner 20 is fired with fuel gas 48 and combustion air 70. Combustion gases ($CO_2$ and $H_2O$), in the presence of carbonaceous materials, such as coal, petroleum coke, graphite, or char, are converted to reductants, CO and $H_2$. The carbonaceous material facilitates melting of the pre-reduced metallized iron charge material 10 at relatively low temperatures, on the order of 1350° C. The reductants and the carbonaceous material complete the reduction of any remaining iron oxide to iron. Laboratory data results show that the melting/reduction process occurs when the carbon content is about 1.5 to 3.5 percent, at a temperature of 1350° C. to 1450° C. To achieve similar melting using a blast furnace, which generally operates in the range of 4.2 to 4.8% carbon, requires temperatures in excess of 1420° C. It has been postulated that the lower melt temperature is partially a consequence of the presence of the reductant gases, and particularly carbon monoxide. To appreciate how low the process melt temperature is the reader is reminded to consider that the melting point of pure iron is 1535° C., cast iron 1000 to 1300° C., wrought iron 1500° C. and carbon steel 1520° C.

When the pre-reduced metallized iron charge material 10 melts, the surface tension of iron is sufficiently high that, instead of simply flowing together to form a sheet of iron, the iron beads up, like water on a hydrophobic surface, forming a liquid nugget. Slag forms and migrates upward forming a cap (kippah) on the liquid nugget, or flows completely away from the liquid iron nugget, thereby forming a slag button. The volume of the slag per liquid nugget is proportionately much smaller than the volume of the iron for that nugget. Because the pre-reduced metallized iron charge material 10 is already hot, and only a small portion of the iron oxides still need to be reduced, the melting and finishing is accomplished in a very short time frame. The cycle time in the FHM furnace 14 is typically 3–12 minutes, with 6 minutes being nominal.

Between burner zone 25 and the last zone 23 of the FHM furnace 14 there is a hot flue gas take-off 43, where the furnace gases are vented to the heat recovery systems. The last zone 23 of the furnace 14 is substantially cooler, afforded by a chill device, which preferably is a chill plate 31. In last zone 23 the liquid nuggets and other materials re-solidify. As shown in FIG. 1 and FIG. 5, the discharged iron/slag product 78 of the FHM furnace process, as well as the hearth conditioners 28 and the refractory compounds 30, are collected and conveyed via an auger 22 to a water cooled hot screen 80. The hot screen 80 diverts the undersize product 82 to a cooler 84, and the oversize product 92 directly to the final melter 96 or to the collector 94 for processing later or inventorying (as for instance as a merchant nugget product). Table 1 lists typical properties of the oversize nugget 92.

TABLE 1

| Iron Nugget Chemical Composition | (Weight %) |
| --- | --- |
| Metal Fe | 96–97 |
| FeO | 0 |
| C | 0.1–3.5 |
| Si, Mn, P | Per on raw material specifications |
| S | >0.05 |

The cooler 84 is preferably an indirect inert gas purged rotary cooler, where the preferred inert gas is nitrogen 85. Cooled, undersize product 82 is passed through a magnetic separator 86, which pulls out mini-nuggets 90 from spent material 88, which consists substantially of refractory compounds 30 and hearth conditioners 28. Spent material 88 is only partially spent, and can accordingly be recycled as hearth conditioning materials. As an alternative, undersize product 82 can be recycled hot to the FHM furnace 14.

The oversize product nugget 92 is fed to a final melter, which is preferably a channel induction melting furnace 96, along with alloy additives 98, optionally slag additives 99, and optionally scrap steel 100. Depending on the feed mix of the product to the channel induction melting furnace 96, the process can be geared to iron-making or steel-making. The channel induction melting furnace 96 is tapped on the top to draw off slag 101 and on the bottom, to draw off liquid iron or steel 102.

The invention has heat generation, recovery and conservation systems, where energy generated for the FHM furnace is recovered and used to convert coal into fuel gases, hearth conditioning materials and other carbonaceous materials, electricity, and to augment other energy intensive processes.

Coal 40 is fed into calciner 42, which is fueled by hot gas, preferably tempered flue gas 44 (through the addition of air 70 to furnace hot flue gas take-off gases 43) from FHM furnace 14. Off gas from the calciner is cleaned and scrubbed by scrubber 46, and is recovered as a fuel gas 48. Input water 45, for scrubber 46, discharges as outlet water 47. Fuel gas 48 and air 70 are provided to the furnace burners 20. The air 70 and the fuel gas 48 are preheated respectively by heat exchangers 72 and 74, which derive heat from the tempered flue gas 44. Solid output from the calciner 42 is char 50, which is incorporated into the hearth conditioners 28.

A coal heater/devolatilizer 56 is fed with coal 40, and is fueled by hot gas, preferably tempered flue gas 44 from furnace 14. The output of the heater/devolatilizer 56 is hearth conditioning char 50, which is incorporated in the hearth conditioners 28 for further use. A portion of the off-gas 43 from the lower part of the heater/devolatilizer 56 is cleaned and scrubbed by scrubber 60, and is recovered or discharged through stack 160 as flue gases 127. Input water 45, for scrubber 60, discharges as outlet water 47. The portion of the off-gas from the upper portion of the heater/devolatilizer 56 is cooled and scrubbed in cooler-scrubber 62 and is recovered as fuel gas 48 for the burners 20. Input water 45, for scrubber 60, discharges as outlet water 47.

The invention provides for an effluent scrubber 49, which can serve as a tertiary scrubber for flue gases wherein a mist of water 55 is admixed with the tempered flue gas 44 prior to treatment in scrubber 49. Alternatively, tempered flue gas 44 could be utilized in a cogeneration scheme whereby the sensible heat is converted to steam 76 by way of heating boiler feed water 75 in a waste heat boiler 73. The generated steam 76 could then be converted into electricity by means of employing standard cogeneration technology. Input water 45, for scrubber 49, discharges as outlet water 47. Cooled/cleaned flue gas 126 is vented through stack 160 as stack gas 127.

Figure 2:
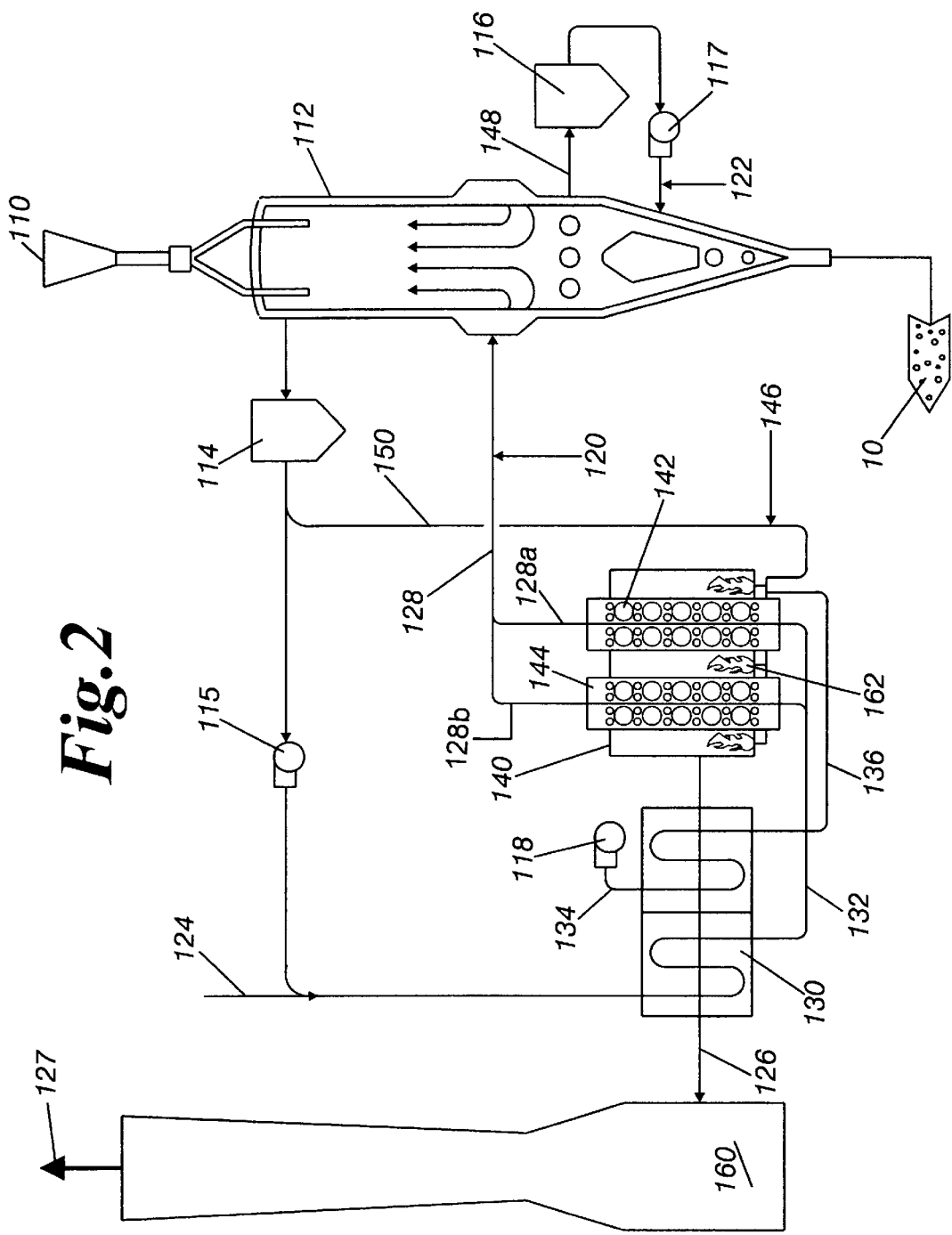
FIG. 2 is a schematic diagram of a shaft furnace direct reduction plant which produces hot pre-reduced metallized iron.

FIG. 2 shows a suitable means for preparing the metallized iron charge material 10. Iron oxide 110 (in the form of fines, pellets and/or lump ore) are fed to a conventional gas or coal-based direct reduction furnace 112; e.g., a Midrex shaft furnace, rotary kiln, fluid bed, etc., for the production of highly reduced DRI 10, or other reduced iron material such as iron carbide (hot or cold). Shown in FIG. 2 is a DRI shaft furnace 112. Iron ore or iron oxide 110 is loaded through the top of the shaft furnace and exits the bottom as pre-reduced metallized iron 10. The bustle gas is a formed from the reformed gas 128 (128a & 128b) and, optionally, natural gas and oxygen 120. Gases in the lower portion of shaft furnace 112 are cycled via line 148 through cooler 116, pressurized by compressor 117 and injected back into the lower portion of the furnace. Natural gas 122 may optionally be added to these gases. Gases in the upper portion of the shaft furnace are recycled and refurbished through the top gas scrubber 114. The top gases are compressed 115, admixed with natural gas 124, warmed with heat exchanger 130, forming 132, prior to passing through the reformed gas catalyst tubes 144 and 142. The reformed gas catalyst tubes are heated in a reformed gas furnace 140. The reformed gas furnace 140 has burners 162, which burn compressed air 118, that is pre-heated in line 134 via the heat exchanger 130 forming heated air 136, and natural gas 146. The burners 162 can also be admixed with top gases conveyed by line 150. The reformed gas furnace combustion gases 126 exhaust through the heat exchanger 130, and into the stack 160, where they exit as flue gas 127.

Figure 3:
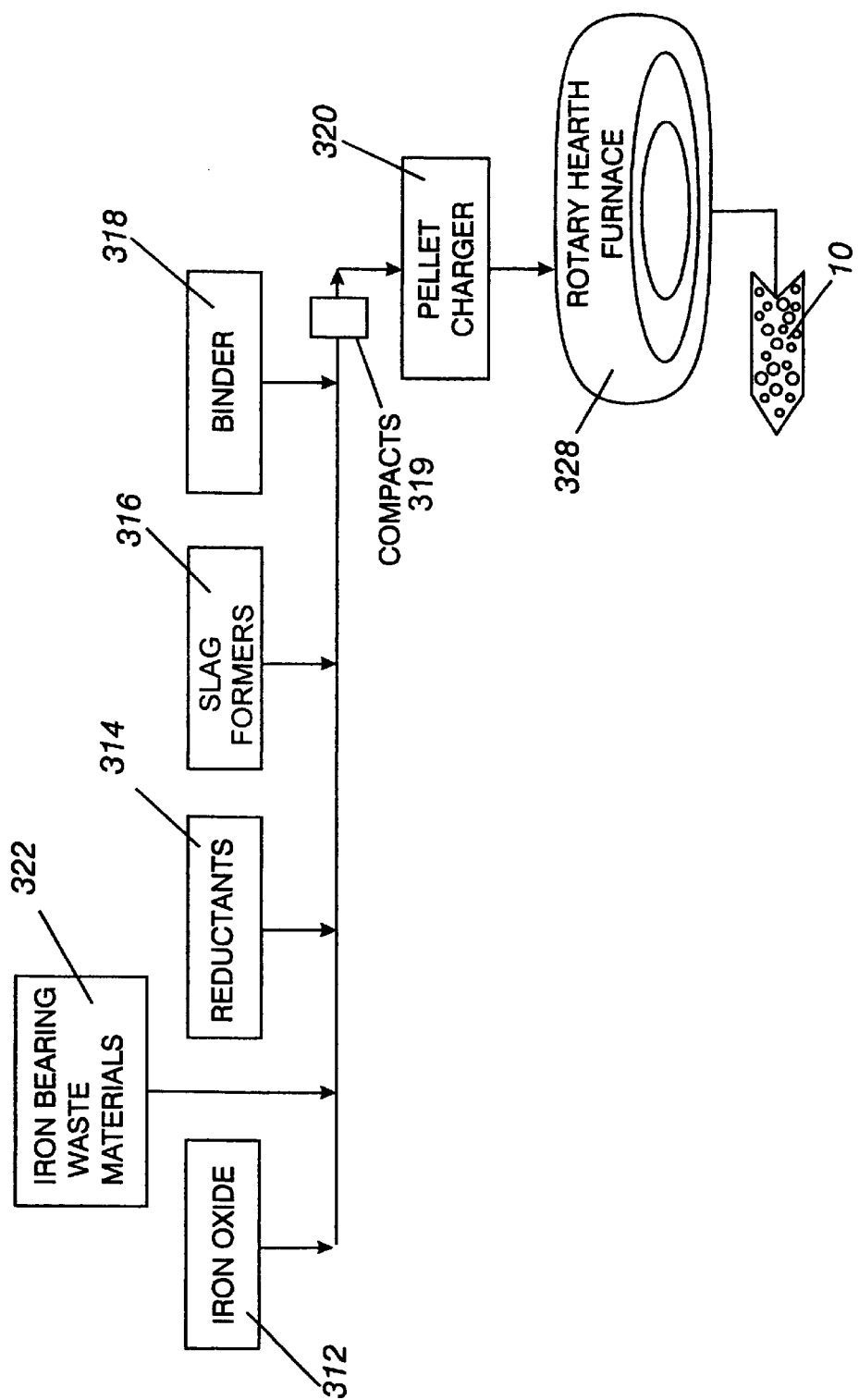
FIG. 3 is a schematic diagram of a rotary hearth furnace direct reduction plant which produces hot pre-reduced metallized iron.

The pre-reduced metallized iron charge material 10 can alternatively be generated via a DRI rotary hearth furnace 328, as shown in FIG. 3. Referring now to FIG. 3, the input materials consist of: iron oxides 312 or iron bearing waste materials such as dust, sludge, mill scale, or combination thereof 322; reductants 314 such as carbonaceous material including coal powder, coal fines, and other carbonaceous materials; slag formers 316 such as $SiO_2$, CaO, $Al_2O_3$, $CaF_2$(fluorspar) and/or MgO; and a binder 318. These materials are formed into compacts 319, preferably in the form of uniformly-sized briquettes or pellets. The compacts fill hopper 320 from which they are continuously conveyed to an input port of a rotary hearth furnace 328. The iron oxide bearing compacts are placed in a layer or layers over the hearth surface. The hearth rotates, progressing the material through two or more hot zones that effect a reduction of the oxides without the material becoming liquid. The exit material, pre-reduced iron, DRI of this first hot process is about 70% to 95% metallized iron at a temperature of approximately 700° C. to approximately 1100° C. The pre-reduced metallized iron is conveyed directly, hermetically and continuously to holding bin 21, and then onto the FHM furnace 14, shown in FIG. 1 and FIG. 5.

It is anticipated that heat recovery means, such as the recycling of off gases from the FHM furnace and the DRI shaft furnace or DRI rotary hearth furnace, can be shared amongst the support systems supplementing the overall method of iron-making and steel-making. For instance, while not particularly described, it is anticipated that under some circumstances it may be more efficient to use off-gas from the FHM furnace to heat reformed gases than to heat a coal calciner, if so, then the off-gas will be diverted to the reformed gas furnace 140.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A method for producing iron or steel from iron oxide material, comprising the steps of:
   (a) providing a moving hearth furnace, having a refractory surface;
   (b) introducing carbonaceous materials into said hearth furnace and uniformly placing said carbonaceous materials on said refractory surface;
   (c) pre-reducing iron oxide material to metallized iron material;
   (d) charging pre-reduced metallized iron materials into said hearth furnace on said refractory surface;
   (e) heating and reacting said metallized iron materials in said hearth furnace, to form metallized iron product having a carbon content of about 0.01 to 4%; and
   (f) discharging said metallized iron product from said hearth furnace.

2. A method according to claim 1, further comprising:
   screening the discharged solid iron product from said furnace to separate oversize and undersize product; and recovering the undersize product.

3. A method according to claim 1, further comprising conditioning the hearth surface with a carbon based material.

4. A method according to claim 3, wherein said carbon based conditioning material is selected from the group consisting of graphite, anthracite coal, petroleum coke, and char.

5. A method according to claim 1, further comprising conditioning uniformly the hearth with refractory compounds selected from the group consisting of alumina, bauxite, magnesia, and magnesite.

6. A method according to claim 1, further comprising coating or dusting the outer surface of the pre-reduced iron charge with a carbonaceous material prior to its being charged onto the hearth surface.

7. A method according to claim 2, further comprising introducing the oversize product into a melting furnace, and forming molten steel therein.

8. A method according to claim 1, where after introducing the carbonaceous materials, the carbonaceous materials are uniformly placed using a smoothing device to form a level smooth surface.

9. A method according to claim 1, where after charging, the pre-reduced metallized iron materials are leveled using a pellet leveler to assist in gently moving the pre-reduced metallized iron materials to a single layer.

10. Apparatus for producing iron or steel from iron oxide material, comprising:
   (a) means for pre-reducing iron oxide material to metallized iron material;
   (b) a moving hearth furnace, having a refractory surface;
   (c) means for introducing carbonaceous materials into said hearth furnace and placing said materials on said refractory surface;
   (d) means for charging pre-reduced metallized iron materials into said hearth furnace on said refractory surface;
   (e) means for heating and reacting said metallized iron materials in said hearth furnace, to form metallized iron product having a carbon content of 0.01–4%; and
   (f) means for discharging said metallized iron product from said hearth furnace.

11. Apparatus according to claim 10, further comprising:
   means for screening the discharged solid iron product from said furnace to separate oversize and undersize product; and
   means for recovering the undersize product.

12. Apparatus according to claim 11, further comprising:
   a melting furnace;
   means to introduce said oversize product into said melting furnace, and to form molten steel therein.

13. Apparatus according to claim 12 wherein said melting furnace is an electric furnace.

14. Apparatus according to claim 12 wherein said melting furnace is a channel induction furnace.

15. A method for producing iron or steel, comprising the steps of:
   (a) distributing hearth conditioning material on a refractory surface of a FHM furnace, where hearth conditioning materials are comprised of carbonaceous materials;
   (b) charging pre-reduced metallized iron onto the hearth conditioning material;
   (c) heating until molten and reacting the pre-reduced metallized iron in said FHM furnace, to form nuggets having a carbon content of about 0.01 to 4% and slag; and
   (d) cooling and discharging solid nuggets, slag and hearth conditioning material from said FHM furnace.

16. A method according to claim 15, further comprising:
   screening the nuggets from said FHM furnace to separate oversize and undersize product;
   recovering the undersize product; and
   recovering the hearth conditioning materials.

17. A method according to claim 15, further comprising hearth conditioning materials, where the hearth conditioning material promotes slag desulfurization.

18. A method according to claim 15, wherein said carbonaceous material is selected from the group consisting of graphite, anthracite coal, petroleum coke, and char.

19. A method according to claim 15, further comprising conditioning the hearth surface with refractory compounds selected from the group consisting of $SiO_2$, CaO, alumina, bauxite, $CaF_2$ (fluorspar), magnesia and magnesite.

20. A method according to claim 15, further comprising coating or dusting the outer surface of the pre-reduced metallized iron with a powdered carbonaceous material prior to its being charged onto the refractory surface.

21. A method according to claim 16, further comprising introducing the oversize product into a melter furnace, and forming molten steel therein.

22. A method according to claim 15, wherein said pre-reduced metallized iron is hot DRI product from a shaft furnace.

23. A method according to claim 15, wherein said pre-reduced metallized iron is hot DRI product from a rotary hearth furnace.

24. A method according to claim 15, wherein said FHM furnace is a modified rotary hearth furnace that is heated via burners that that burn fuel gas and air producing combustion gases.

25. A method for producing iron or steel according to claim 24, where said combustion gases in the presence of carbonaceous materials are partially converted to at least one reductant, where at least one reductant is carbon monoxide.

26. A method for producing iron or steel according to claim 25, where carbon monoxide reacts with residual iron oxide to form iron.

27. A method according to claim 25, further comprising:
   recycling off-gas from the FHM furnace to provide heat for support processes such as calcining coal to form fuel gas and hearth conditioning materials, warming combustion air, and heating a coal heater/devolatilizer.

28. A method according to claim 15, where said distributing hearth conditioning material on the refractory surface of the FHM furnace, further comprises using a smoothing device to form a level smooth surface.

29. A method according to claim 15, where said pre-reduced metallized iron materials into said hearth furnace on said refractory surface which is charged on the hearth conditioning material is leveled using a pellet leveler to assist in gently moving the said pre-reduced metallized iron materials forming a single layer on the refractory surface of the FHM furnace.

30. A method according to claim 8 wherein said smoothing device is an auger-screw device.

31. A method according to claim 9 wherein said pellet leveler is a screw device with flights, spikes and nubs.

32. A method according to claim 28 wherein said smoothing device is an auger-screw device.

33. A method according to claim 29 wherein said pellet leveler is a screw device.

* * * * *